UNITED STATES PATENT OFFICE.

PHILIPPE BARBIER, OF LYONS, FRANCE, ASSIGNOR TO L. DURAND, HUGUENIN & CIE., OF BASLE, SWITZERLAND.

SYNTHETIC VIOLET-OIL AND PROCESS OF MAKING SAME.

SPECIFICATION forming part of Letters Patent No. 617,552, dated January 10, 1899.

Application filed June 24, 1898. Serial No. 684,416. (Specimens.)

*To all whom it may concern:*

Be it known that I, PHILIPPE BARBIER, a citizen of the French Republic, and a resident of Lyons, France, have invented certain Improvements in the Manufacture of Perfumes, (for which a patent has been applied in France May 26, 1898,) of which the following is a clear and complete specification.

Certain aldehydes having the constitution $C_{10}H_{16}O$—such as lippial, which is found in considerable quantity in the essence of lippia citriodora or Spanish verbena-oil, and citral, which is found in the essence of lemon-grass—are condensed under the influence of various alkaline reagents—such as aqueous solutions of caustic soda, sodium carbonate, barium hydroxid, or other alkaline solutions—with oxid of mesityl (methylpentenone) and produce a new ketone. This new body has the formula $C_{16}H_{24}O$, or

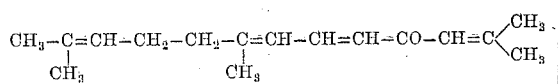

or

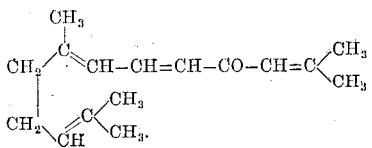

It represents a ketone with open ring with four ethylene bonds and is formed by aldolic condensation of the reacting aldehyde and ketone. It is obtained in the form of a yellowish oil which boils between 180° and 185° centigrade under a pressure of ten millimeters. The new ketone has no characteristic odor; but it can be easily transformed into an isomerid, which is characterized by an odor exactly like that of violets. This isomerid has the following constitutional formula:

(See formula next column.)

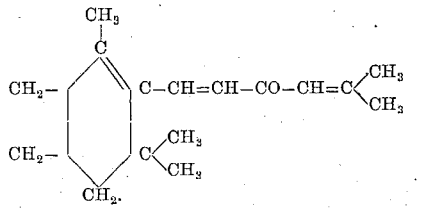

It is a tetrahydrobenzene derivative, which is formed when the new ketone is subjected to the action of acid condensing agents. Sulfuric acid is preferably employed. It may be of various degrees of concentration, care being taken to regulate the temperature according to the concentration of the acid. The product of the reaction is separated by ether extraction and purified by rectifying *in vacuo*. It boils at about 162° centigrade under a pressure of ten millimeters, and thus it is obtained in the form of a yellowish oil. The odor of this product is very sweet and delicate, resembling that of violets and iris-root, and this insures an important use of this substance for perfumery.

The preparation of the new substance will be understood from the following example:

*Preparation of the new ketone.*—This product is obtained by dissolving in methyl alcohol or other solvents equal molecular proportions of lippial and oxid of mesityl (methylpentenone) and adding for every one hundred grams of lippial ten cubic centimeters of soda-lye of ten per cent. strength. The mixture is left at ordinary temperature for about fifteen hours and is then acidulated with acetic acid. All the volatile ingredients are driven off by steam, and the oil which remains is extracted by ether. The product is rectified *in vacuo*, and a pure product is obtained by collecting the product which distils at 180° to 185° centigrade under a pressure of ten millimeters. The formation of this product is shown by the following formula:

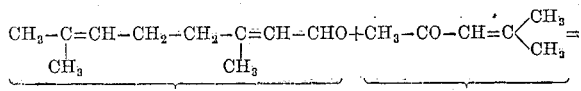
Lippial.     Oxid of mesityl.

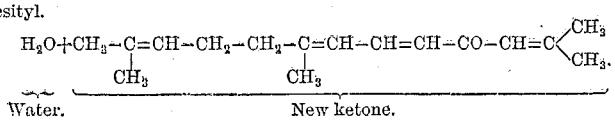
Water.     New ketone.

*Transformation into the isomerid.*—The new ketone is introduced into six times its weight of sulfuric acid of sixty-five per cent. strength while cooling and agitating the mixture. When all is added, the mixture is agitated for about half an hour at ordinary temperature, then for a quarter of an hour at 35° centigrade. It is then poured on ice to separate the product. It is extracted by ether and then rectified *in vacuo*. The pure product boils at about 162° centigrade under a pressure of ten millimeters.

By substituting citral for lippial in the process described similar products are obtained.

What I claim is—

1. An improvement in the manufacture of perfumes by condensing an aldehyde of the formula $C_{10}H_{16}O$, as citral, with methylpentenone (oxid of mesityl) under the influence of an alkaline reagent, substantially as described.

2. An improvement in the manufacture of perfumes, by condensing an aldehyde of the formula $C_{10}H_{16}O$, as citral, with methylpentenone (oxid of mesityl) under the influence of an alkaline reagent and transforming the product of condensation thus obtained, after purification, into an isomeric ketone by subjecting it to an acid condensing agent, substantially as described.

3. As a new article of manufacture, the herein-described perfume forming a yellowish oil having very sweet and delicate odor resembling that of violets and iris-root and boiling at about 162° centigrade under a pressure of ten millimeters.

In witness whereof I have hereunto signed my name in the presence of two subscribing witnesses.

PHILIPPE BARBIER.

Witnesses:
JOSEPH BIERA,
JULES FEURER.